April 17, 1956  H. D. CLEMMONS  2,742,256
BALL COCK WITH SILENCER
Filed Dec. 17, 1954

INVENTOR
Herbert D. Clemmons
BY
H. F. Johnston
ATTORNEY

United States Patent Office 2,742,256
Patented Apr. 17, 1956

2,742,256
BALL COCK WITH SILENCER

Herbert D. Clemmons, Cheshire, Conn., assignor to Scovill Manufacturing Company, Waterbury, Conn., a corporation of Connecticut Application December 17, 1954, Serial No. 475,895

3 Claims. (Cl. 251—122)

This invention relates to improvements in ball cocks and more particularly to improvements in that type of ball cock shown in my prior Patent No. 1,981,904, dated November 27, 1934.

My improvements involve a change in shape and arrangement of parts providing for efficient operation and also for greater economy of manufacture.

One of the advantages of my improved construction is the location of the fulcrum of the lever which operates the inlet valve closer to the point of bearing of the lever on the valve casing so as to provide a greater leverage and more positive shut-off.

Another advantage of my improved construction is that the silencing device can be made somewhat larger and more efficient without increasing the overall size of the valve. The casing in my improved valve is more economical to manufacture and by making the V-groove element of the silencing means in a separable removable piece, it is much easier to machine such a groove.

A structure which is a preferred embodiment of my invention is illustrated in the accompanying drawing, in which.

Figure 1:
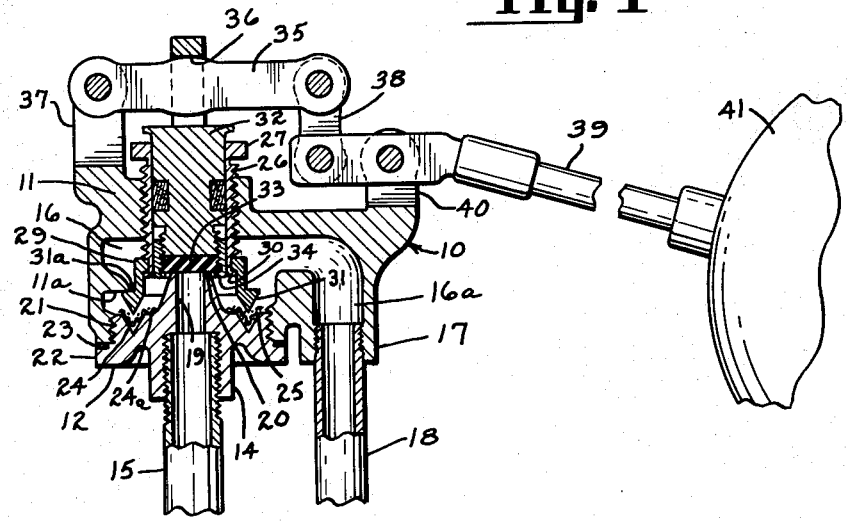
Fig. 1 is a vertical cross sectional view of a ball cock valve embodying my invention.

Referring more particularly to the drawing, the reference numeral 10 indicates generally a ball cock valve consisting of a cast body or casing 11 having its open lower end closed by a removable base 12. The base 12 is formed with a depending hollow boss 14 having threaded engagement with the upper end of a supply pipe or riser 15. The boss 14 is made hexagonal in shape to which a wrench may be applied in assembling the base 12. The lower end of the supply pipe 15 is connected to the base of a flush tank (not shown) in the usual manner.

The valve body 11 has a discharge chamber 16 having a lateral port 16a leading into a depending hollow embossment 17 formed as a part of said body. A discharge tube or pipe 18 is threadedly connected to the embossment 17.

Considering now the details of the base 12, this part is provided with an upwardly extending tapering nozzle 19 aligned with the supply pipe 15 and terminating in a valve seat 20. The base 12 is provided with a threaded section 21 for threaded engagement to the lower open end of the body 11 and has a circumferential flange 22 which is adapted to seat against said body with an interposed sealing washer 23 therebetween. A V-shaped annular groove 24 is formed in the base 12 and surrounds the nozzle 19. Disposed in the V-shaped groove 24 is a similarly shaped annular screen element 25, the purpose of which will be explained later. The inner wall of the V-shaped screen 25 terminates in an inwardly directed flange 25a that is adapted to rest upon a ledge or shoulder 24a provided between the V-shaped groove 24 and the nozzle 19 of the base 12.

A tubular valve sleeve 26 is threadedly engaged in the upper closed end of the body 11 and is provided with a hexagonally shaped flange 27 at its outer end for the purpose of receiving a suitable wrench in adjusting said sleeve within the body 11. The inner end of the sleeve 26 is formed with a reduced neck 28 over which is fitted a flow-restricting member or regulator 29 held therein-place by outwardly flanging the end of neck 28 as indicated at 30. The regulator 29 is formed with an enlarged V-shaped head 31 that is adapted to align with the V-shaped groove 24 in the base in spaced relation thereto to provide a similar shaped channel or discharge passage within which is disposed the screen element 25.

Figure 2:
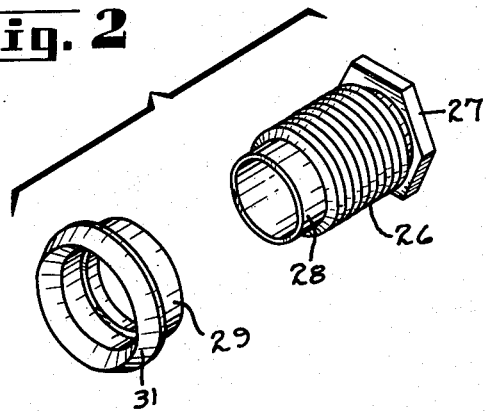
Fig. 2 is a perspective view of a valve sleeve and flow-restricting member showing the parts detached.
Figure 3:
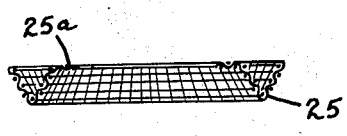
Fig. 3 is a sectional view of the wire screen diffusing member.

In making the assembly of the regulator 29 to the sleeve 26, it should be understood that this assembly is accomplished within the casing 11. The sleeve 26 in the state as shown in Fig. 2 is threaded into the casing 11 from the upper end thereof and while the base 12 is removed the regulator 29 is assembled into the chamber 16 through the lower open end of the casing 11 and fitted upon the sleeve neck 28, after which the latter is flanged outwardly, as explained above. As noted in Fig. 1, the head 31 of the regulator 29 is substantially larger than the upper portion of the regulator thus providing a shoulder 31a. This shoulder 31a is adapted to abut against a lug 11a projecting within the chamber 16 to limit the outward adjustment of the regulator.

A plunger-like valve 32 is slidably fitted within the sleeve 26 for coaction with the valve seat 20. The lower end of the valve 32 is provided with a sealing disc 33 which is held in place by a flanged collar 34 threaded to the body of said valve. The valve 32 is adapted to be actuated by a lever 35 passing through a slot 36 provided in the outer end of said valve. One end of the lever 35 is pivoted to an upstanding post 37 formed as an integral part of the casing 11. The opposite end of the lever 35 is pivotally connected to a link 38 which in turn is pivotally connected to one end of a ball float arm 39. The arm 39 is pivotally mounted on another post 40 extending upwardly from the casing 11 diametrically opposite the post 37. The outer end of the arm 39 is provided with the usual ball float 41 that is actuated by the rising water in a flush tank to move the ball cock valve 32 to closed position in the well known manner.

In the operation of the device when the valve 32 is opened, water will rush up through the nozzle 19 and be deflected downwardly by the valve 32 and regulator 29 and pass through the V-shaped channel defined by the regulator head 31 and the V-groove 24 in base 12. In passing through the V-shaped channel, the water will be forced through the interstices provided in the wire mesh of the wire screen 25. This will serve to further break up the flow of the water before it enters into the chamber 16 and consequently quiet the flow of water to a maximum degree. The purpose of providing a flange 25a on the screen 25 is to eliminate any rough cut edge of the screen lying in line with the direct flow of fluid as it passes through the V-shaped channel such as would cause or set-up noise-making turbulence in the fluid flow.

By reason of the fact that the base 12 is made as a separate part from the body 11 the V-shaped groove 24 in said base can be more easily machined and also provides for a larger V-groove that will serve to take a larger amount of water in a given period of time and further minimize the noise effect of water flow.

Also the fact that the flow-restricting bushing 29 is made as a separate part from the sleeve 26, the sleeve can be made considerably smaller in diameter and this will allow the pivot point of the arm 37 to be brought closer to the central axis of the ball cock which will allow considerably more leverage to be applied to the valve in the operation of the ball cock.

While the form of the invention herein shown and described embraces a preferred embodiment of the same, it is to be understood that the construction may be varied as to mechanical details without departing from the spirit of the invention and the scope of what is claimed.

I claim:

1. A ball cock comprising in combination a valve casing having a discharge chamber and a bottom opening, a removable member for closing the bottom opening, said member having a central aperture providing means for connecting an inlet pipe thereto and a nozzle rising upwardly therefrom terminating in a valve seat within said discharge chamber substantially above the bottom thereof, said casing having an upper bore aligned with said inlet nozzle, a relatively thin sleeve threaded into said bore and adjustable from the upper side of said casing, a plunger valve fitted within said sleeve for coaction with said valve seat, and a regulator member secured to the lower portion of said sleeve and having an annular V-head at its bottom which is substantially larger in diameter than said upper bore, said bottom closure member being provided with a V-groove receiving said V-head in spaced relation to provide an annular V-discharge passage leading from said valve seat to the discharge chamber, said bottom opening being large enough to permit said regulator member to be inserted therethrough into said chamber prior to being secured to said sleeve.

2. A ball cock according to claim 1 in which said regulator member has a central top opening and wherein said sleeve has a reduced portion fitted into said opening and permanently secured thereto by an outwardly extending flange on the end of said reduced portion.

3. A ball cock comprising in combination a valve casing having a discharge chamber, a central vertical bore and a lateral outlet above the bottom of said chamber, an inlet pipe rising into said chamber from the bottom thereof and having an upwardly projecting nozzle terminating in a valve seat within said discharge chamber substantially above the bottom thereof, a valve sleeve threaded in said bore for longitudinal adjustment and having a regulator with an annular V-head at its bottom, the bottom of the discharge chamber being provided with an annular V-notch or groove receiving said V-head in spaced relation to provide an annular V-discharge passage, said groove surrounding said nozzle in spaced relationship to provide a shoulder therebetween, and a wire mesh screen of V-shaped cross section having its inner wall terminating in an inwardly formed flange, said flange being supported on said shoulder for loosely positioning said screen between said V-head and V-notch.

References Cited in the file of this patent

UNITED STATES PATENTS

| | | |
|---|---|---|
| Re. 20,246 | Binnall | Jan. 19, 1937 |
| 1,981,904 | Clemmons | Nov. 27, 1934 |
| 2,595,766 | Clemmons | May 6, 1952 |